Feb. 28, 1961 H. STRUCK 2,972,979
COMBINATION HOG FARROWING FEEDER AND WATERER
Filed Feb. 5, 1959
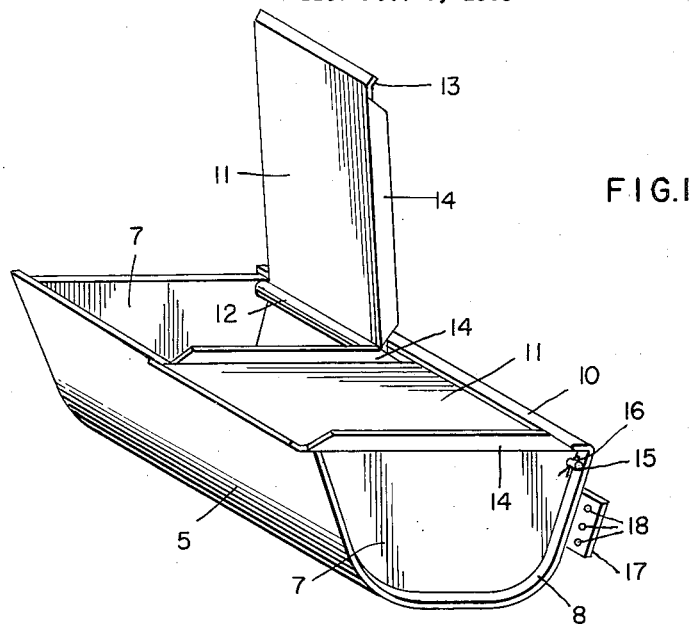
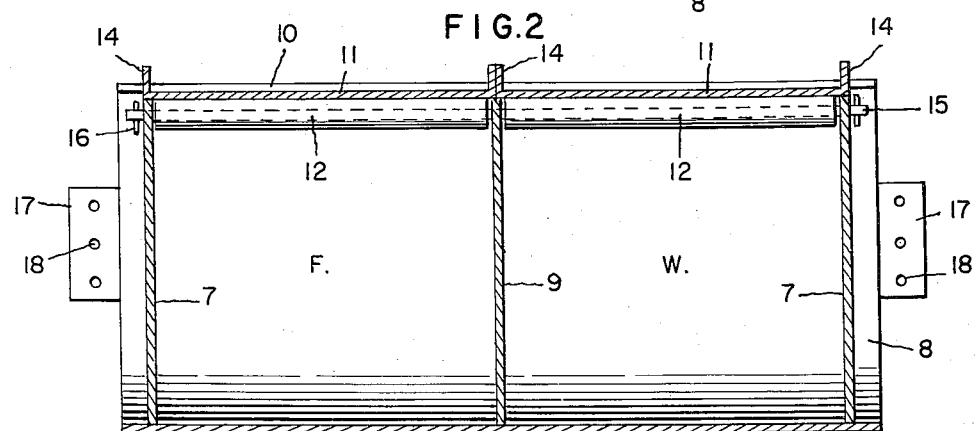
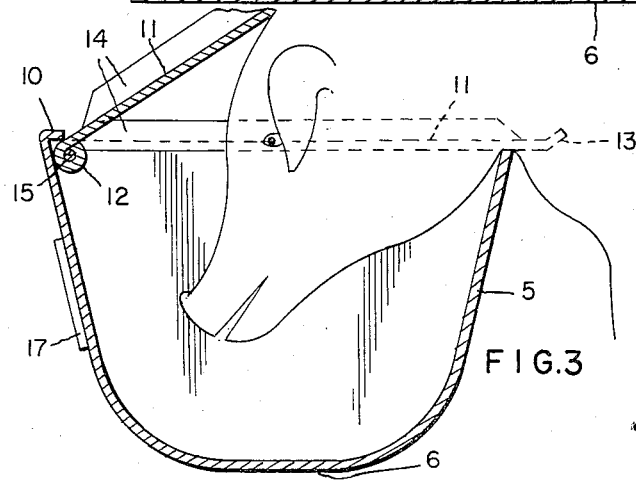
INVENTOR.
Horace Struck
BY
*Garvey & Garvey*
ATTYS

2,972,979
COMBINATION HOG FARROWING FEEDER AND WATERER

Horace Struck, Chancellor, S. Dak.

Filed Feb. 5, 1959, Ser. No. 791,305

2 Claims. (Cl. 119—51.5)

The present invention is a combination hog farrowing feeder and waterer and has for a principal object to provide a commercially practical, divisible feeder and waterer which is constructed to completely encase the feed and water compartments in a manner to positively prevent contamination of the feed and water by extraneous substances, solid or fluid, at the same time permitting ready access to the compartments by the sow and expeditious closing of the compartments when the sow's head is withdrawn therefrom.

Other objects are to provide a feeder and waterer which is of very simple durable construction, including movable compartment closures, which effectively seal the tops of the compartments against the entry of fecal matter, urine and the like which, when mixed with the feed or water, sours the milk of the sow with resultant deleterious effect on the litter; to provide a feeder and waterer, the body of which is of unitary construction, with plates fitted therein to provide stationary end closures and a stationary partition wall; to provide a feeder and waterer body which includes an integrally formed abutment flange on the aft wall of the body to limit the extent of movement of the movable compartment closures and insures gravitation of the closures when the sow has completed feeding or watering; to provide a common axis for the closures which is concealed within the body of the feeder and waterer to house the axis from contact with the elements and/or extraneous materials, insuring efficient functioning of the movable closures at all times; and to have the terminals of the feeder and waterer body projected beyond said stationary closures to reinforce and protect the latter and provide an extension to hold a supporting bracket on one or both terminals of the feeder and waterer body.

Other objects of the invention will be manifest from the following description of the present preferred form of the invention, taken in connection with the accompanying drawing; wherein:

Fig. 1 is a perspective view of a hog farrowing feeder and waterer constructed in accordance with this invention, showing the movable closure of one of the compartments open and the other closure in a closed position;

Fig. 2 is a vertical, longitudinal sectional view of the feeder and waterer, showing the movable closures in closed position; and Fig. 3 is a vertical sectional view fragmentarily showing one of the movable closures in approximately the position it is in during the feeding or watering of a hog.

The device of the present invention includes an open-top trough body 5, formed from a single sheet of metal or other suitable material, the base thereof being flat, as indicated at 6 for surface engagement with the ground or floor of a building, if desired. The trough is also adapted to be suspended in a manner which will be more fully hereinafter explained. The trough is adapted, additionally, for the reception of a pair of stationary end plates 7, each of which is secured at a point spaced from its respective end of the trough, as illustrated to advantage in Figs. 1 and 2, to provide a marginal extension or flange 8. A plate 9 is fixedly mounted in the trough, approximately mid-way the ends of the latter, to provide a partition wall, thereby dividing the troughs into two compartments "F" and "W."

The upper margin of the aft wall of the trough is bent inwardly at right angles to provide an abutment flange 10, the function of which will be presently described.

Each of the compartments "F" and "W" is adapted to be closed by a movable closure 11, the closures being of identical construction, each comprising a flat plate, the aft margin of which is coiled to provide a sleeve 12, the forward margin being bent upwardly to provide a lip 13 and the side margins turned up at right angles to provide confining sides 14. A shaft 15 extends longitudinally through the trough, the ends thereof being journaled in the closed end 7 of the trough, an intermediate portion of the shaft extending through a complemental opening in the partition plate 9. As shown to advantage in Figs. 2 and 3, the shaft 15 is mounted within the sleeve 12 to form an axis for each of the movable closures 11. The shaft is held from longitudinal displacement by cotter pins or like means 16.

It will be noted from the drawings, that the shaft 15 and sleeve 12 are completely within the trough body, below the plane of the abutment flange 10, so as to house the axis of the movable closures 11 from extraneous materials and the elements which might interfere with the free functioning of said closures.

It is of course desirable to anchor hog feeders and waterers to prevent them from being displaced and dumped over, with obvious undesirable results. For this purpose, I provide a bracket 17 one of which may be engaged with each of the marginal extensions or flanges 8 as shown in Figs. 1 and 2. Each of the brackets is provided with a plurality of openings 18 adapted for selective reception of conventional securing means.

In use of this device, the feeder and waterer is secured at a suitable location in a farrowing pen and a pregnant sow placed therein. After the litter is born, the sow and the litter remains in the pen for approximately eight weeks. During this period, it is of considerable importance that the feed and water be un-contaminated, and one of the purposes of this invention is to provide a feeder and waterer which has now been extensively used and found to fulfill these requirements and to solve the problem of feed and water contamination during said period.

It is understood that the feeder and waterer is opened by the sow, by engagement of the snout with the forward projecting end of the lid of the compartment. With the present invention, the forward end or lip 13 is turned upwardly in an arc, as shown in Fig. 1, to facilitate opening movement of the closure by the snout of the sow, and to eliminate the free edge of the lip from biting into the sow. Also of importance is the fact that the upturned lip 13 coacts with the confining sides 14 to retain extraneous materials, insuring expulsion of the latter when the closure is moved upwardly and also facilitating removal of extraneous material therefrom, when the closure is in a closed position.

Upon reference to Fig. 3 of the drawing, it will be noted that the sleeve 12 has a portion thereof extended upwardly for contiguity with the inner edge of the flange 10 to prevent materials carried by the closure 11 from gravitating into the compartment when the closure is in an open position.

While I have herein described and shown a preferred embodiment of my invention, it is nevertheless to be understood that various changes may be made therein, without departing from the spirit and scope of the claims hereto appended.

What I claim is:

1. A combination hog farrowing feeder and waterer including an open top trough body the ends of which are closed, and the top of the aft edge of the body turned in at right angles to form a flange, a fixed partition wall in the trough body intermediate said closed ends, to provide a pair of compartments, a shaft extending longitudinally through the closed ends and partition of the trough, below said flange, and a closure for each compartment, the aft margin of each closure being convoluted on the shaft to provide a hinge, the extent of opening movement of the closures being limited by the body trough flange.

2. The combination of claim 1 wherein the end plates of the trough recede from the opposite terminals of the trough, and brackets secured to the ends of the trough, beyond the plates, for engaging the trough to a vertical support.

References Cited in the file of this patent

UNITED STATES PATENTS

| | | |
|---|---|---|
| 103,935 | Sherman | June 7, 1870 |
| 1,718,472 | McCollough | June 25, 1929 |
| 2,669,219 | Schroeder | Feb. 16, 1954 |